July 14, 1931.  D. C. PRINCE  1,814,850

VAPOR ELECTRIC APPARATUS

Filed Oct. 12, 1926

Inventor:
David C. Prince,
by *His Attorney.*

Patented July 14, 1931

1,814,850

UNITED STATES PATENT OFFICE

DAVID C. PRINCE, OF SCHENECTADY, NEW YORK, ASSIGNOR TO GENERAL ELECTRIC COMPANY, A CORPORATION OF NEW YORK

VAPOR ELECTRIC APPARATUS

Application filed October 12, 1926. Serial No. 141,186.

My invention relates to space discharge apparatus comprising main electrodes and a grid or control electrode, and has for its principal object the provision of an improved means for regulating the grid potential of such apparatus.

In the operation of space discharge or vapor electric apparatus, such as a mercury arc device provided with grids and arranged to rectify or derectify the current interchanged between direct and alternating current circuits, it is essential for satisfactory operation that the potential of the grids lead that of the anodes and be comparatively high when current is transferred from one anode of the apparatus to another. If the anode voltage were always of sinusoidal wave form, it would be satisfactory to apply this voltage to the grid through a capacitor which would produce the required phase relation between the grid and anode voltages. The anode voltage, however, tends to assume a rectangular wave form. The application of such a voltage to the low reactance grid circuit results in a grid potential which approaches zero asymptotically when the apparatus is operated at the usual commercial frequencies, and has a low value when current is to be transferred between the anodes. This potential is therefore unsatisfactory, especially in the case of apparatus requiring a positive grid potential to start the anode current. In accordance with my invention, this difficulty is avoided by tuning the grid circuit to the frequency of the voltage applied to the anodes of the space discharge apparatus or a frequency slightly larger than that of the anode voltage.

My invention will be better understood from the following description when considered in connection with the accompanying drawings, and its scope will be pointed out in the appended claims.

Figure 1:
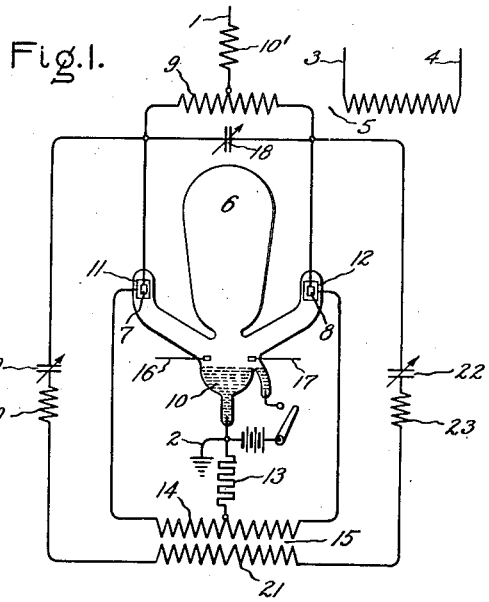
Figure 2:
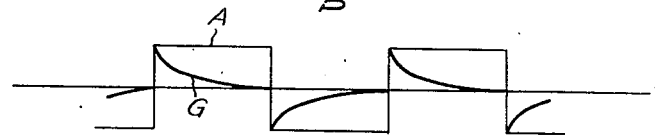
Figure 3:
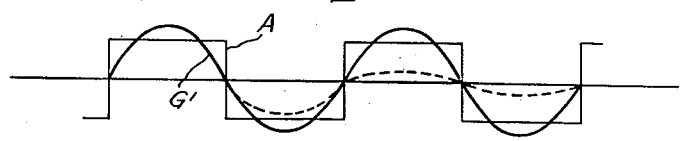

Referring to the drawings, Fig. 1 diagrammatically shows a vapor electric apparatus to which my invention has been applied, and Figs. 2 and 3 are curves illustrating the operation of this apparatus.

Fig. 1 illustrates an apparatus comprising direct current terminals 1—2 and alternating current terminals 3—4 which are interconnected through means comprising a transformer 5 and a vapor electric apparatus 6. The apparatus 6 is provided with anodes 7 and 8 which are connected to opposite end terminals of a winding 9 of the transformer 5, with a mercury cathode 10 which is arranged to be connected through the direct current terminals 1—2 and a smoothing reactor 10' to a terminal intermediate the ends of the winding 9, with grids 11 and 12 which are connected to the cathode 10 through an impedance device 13 and opposite halves of a winding 14 of a grid transformer 15, and with exciting electrodes 16 and 17 which may be connected to the cathode 10 through a suitable source of excitation. A condenser 18 is connected between the end terminals of the winding 9 for the purpose of controlling the frequency at which power is delivered to the circuit 3—4 through the transformer 5. It will be observed that potential is applied to the grids 11 and 12 through a capacitor 19 and a reactor 20 which are connected between the anode 7 and the left-hand end of a winding 21 of the grid transformer 15 and through a capacitor 22 and a reactor 23 which are connected between the anode 8 and the right-hand end of the winding 21.

When the grid circuit is connected as illustrated and is not tuned, the grid potential tends to approach zero asymptotically and to become very low near the end of each half cycle of the anode voltage. The relation between the anode and grid voltages under these conditions is illustrated by Fig. 2 wherein the anode voltage is represented by the curve A and the grid voltage is represented by the curve G. As previously indicated, a grid potential having the wave form represented by the curve G is unsatisfactory for the reason that it has a small value when it is required to aid in the transfer of current from one anode of the apparatus to another.

This difficulty is obviated by adjusting the capacitors 19 and 22 and the reactors 20 and 23 so that the grid circuit is tuned to a frequency substantially the same as that of the anode voltage. By this adjustment, the wave form of the grid potential is changed from that represented by the curve G of Fig. 2 to that represented by the curve G' of Fig. 3 and positive operation of the apparatus is ensured for the reason that the grid potential changes in value very rapidly just before and after the instant when it is zero. By tuning the grid circuit for a frequency slightly higher than that of the anode circuit, the grid potential is given the phase advance required for satisfactory operation of the apparatus. Part or all of the reactance required for tuning the grid circuit may be produced by proper design of the transformer 21.

The embodiment of the invention illustrated and described herein has been selected for the purpose of clearly setting forth the principles involved. It will be apparent, however, that the invention is susceptible of being modified to meet the different conditions encountered in its use, and I therefore aim to cover by the appended claims all modifications within the true spirit and scope of my invention.

What I claim as new and desire to secure by Letters Patent of the United States, is:—

1. The combination of alternating and direct current circuits, vapor electric apparatus comprising a cathode and anode connected between said circuits and a grid arranged to control the current transmitted between said cathode and anode, a grid potential control circuit connected directly to said anode, said control circuit having such constants that said circuit is resonant at a frequency slightly above that of said alternating current circuit.

2. The combination of a plurality of power circuits, vapor electric apparatus comprising a cathode and anode connected between said circuits and a grid arranged to control the current transmitted between said cathode and anode, a grid potential control circuit, and means arranged to tune said control circuit to a frequency slightly different from that of said anode.

3. The method of controlling the operation of an apparatus wherein current is interchanged between a plurality of power circuits through a vapor electric device provided with a control circuit comprising a grid, which comprises tuning said control circuit to a frequency slightly greater than that of one of said power circuits.

4. The method of controlling the operation of an apparatus wherein current is interchanged between direct and alternating current circuits through a vapor electric device provided with a grid and a grid potential control circuit, which comprises tuning said control circuit to a frequency slightly greater than the frequency of said alternating current circuit.

In witness whereof, I have hereunto set my hand this 11th day of October, 1926.

DAVID C. PRINCE.